May 2, 1933.  K. SCHLECKER  1,906,636
PROCESS OF LOCATING LEAKS
Filed Oct. 7, 1929
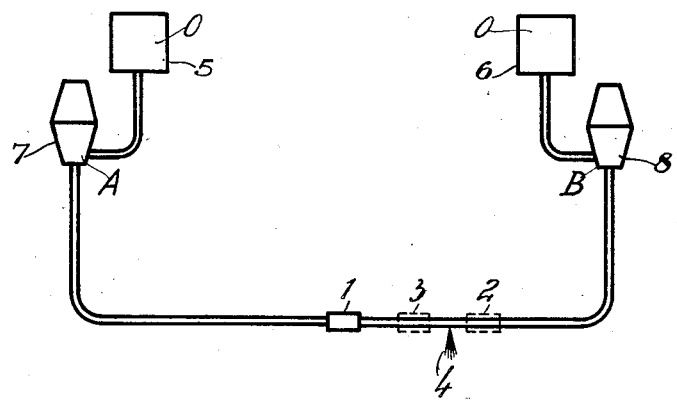
Inventor:
Karl Schlecker
by [signature]
his att'y Patented May 2, 1933

1,906,636

UNITED STATES PATENT OFFICE

KARL SCHLECKER, OF BERLIN-GRUNEWALD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

PROCESS OF LOCATING LEAKS

Application filed October 7, 1929, Serial No. 398,086, and in Germany September 22, 1928.

My invention relates to improvements in the process of locating leaks in oil-filled cables with hollow conductors.

It is already known to freeze the oil in the neighborhood of the ends of oil-filled cables prior to joining the ends of such cables. In particular in the U. S. Patent No. 1,707,324 granted to me on April 2, 1929, I have disclosed such a method.

According to my present invention my aforementioned freezing method is employed in a novel way and with novel results for locating or determining leaks in oil-filled cables with hollow conductors, by narrowing the location of the leak gradually through erecting temporary dams for the oil by freezing the oil at the ends of shorter and shorter section lengths. This has the advantage over the prior art method of erecting paraffine dams inside of the cable, because in the latter case the cable must be first opened, which always involves the danger of air and moisture admission, and further loss of oil. In my novel method the cable remains unimpaired.

In cable installations where the entire cable length is not visible and accessible, such as it would be in cable tunnels, at least the cable joints, stop joints, distribution joints and pot-heads are located in cable shafts which are accessible through manholes. By these different joints the cable is thus divided into individual sections. In these cable shafts or wells, as is well known, oil tanks are provided which are connected with the hollow conductor portions of each cable section, and through which the oil within the cable section is constantly maintained under a suitable pressure above atmospheric. These tanks besides form readily available means by which can be ascertained whether the particular cable section to which the tank is connected has an oil leak. In case of a leak for instance the oil level will show a decrease. In the accompanying drawing a cable section between two cable joints 7 and 8 is diagrammatically shown. Each joint is assumed to be located in a cable shaft (not shown) in which it is connected to an oil pressure tank 5 and 6 respectively. If at the regular inspections the cable section A—B is found to be leaky by observation of the oil levels in the tank at the section end A or B, the exact location of the leakage point is determined as follows: The ground is broken first approximately midway between the manholes, say at the point 1 in the diagram, and a short piece of cable is exposed sufficiently to freeze it at that point, so that a dam of frozen oil is erected within the cable. By then observing the oil level at the two tanks 5 and 6, at the ends of the section, the observer can at once detect on which side of the dam 1 the leak is located. Let us assume that the oil in tank 6 still drops, so that the leak must be to the right of dam 1. Now approximately midway between point 1 and the section end B the ground is broken and a short piece of cable is exposed at the point 2 sufficiently to freeze another oil dam inside of the cable. In the meantime dam 1 is allowed to thaw out. Now it may be observed that the oil in tank 5 drops while it maintains its level in tank 6, which would indicate that the leak is to the left of dam 2 but, of course, it would be to the right of former dam 1, and thus the point of leakage is narrowed between the points 1 and 2. Then the ground is broken approximately midway between points 1 and 2 and sufficient cable is exposed to freeze an oil dam at 3. Meanwhile also dam 2 is allowed to thaw out. It now may be observed that the oil level in tank 5 remains stationary, but that in tank 6 drops, which indicates that the leak must be to the right of dam 3, and between 3 and former dam 2. The distance between 2 and 3 may already be so short that it pays to open up the ground along the entire length between 2 and 3, so that this entire stretch can be observed and the leak quickly seen. In this manner a comparatively long cable section can be quickly examined with relatively few test holes in the ground, at none of which, however, it is necessary to open the cable itself in order to erect the dam, as was necessary in the prior art method.

I claim as my invention:

The method of locating an oil leak in a section of an oil filled cable, comprising freezing the oil in the cable at a point intermediate the ends of the cable section to form a dam dividing the same into subsections, detecting the subsection in which the leak continues, further subdividing the subsection so detected by freezing the oil at a point intermediate its ends to form a dam, detecting which side of the second dam the leak is on, and continuing the process until the location of the leak has been determined.

In testimony whereof I affix my signature.

KARL SCHLECKER.